Figure 1:
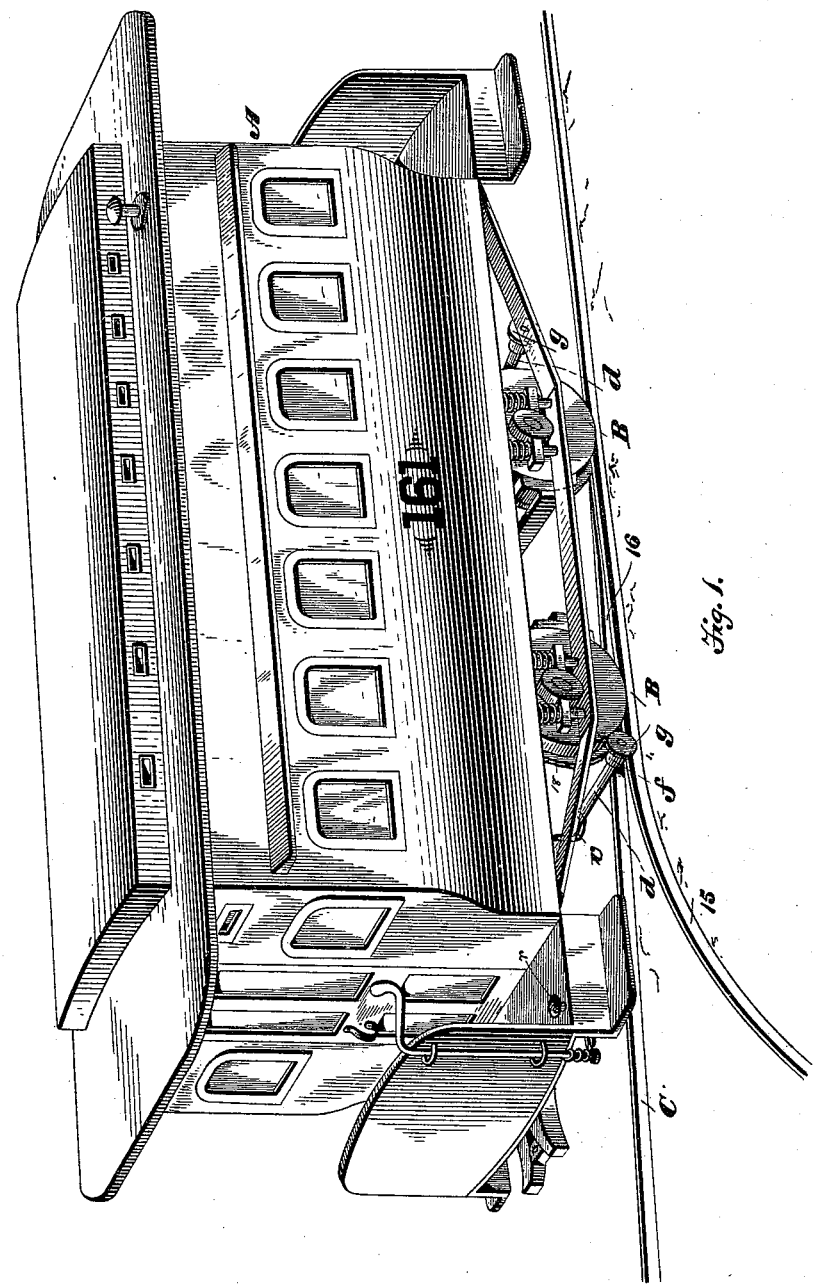

(No Model.)  2 Sheets—Sheet 1.

J. YOUNG.
SWITCH DEVICE FOR STREET CARS.

No. 450,549.  Patented Apr. 14, 1891.

Witnesses:
J. M. Fowler Jr.
M. H. Eager

Inventor:
Jeremiah Young
By, C. A. Shawles
Attorneys (No Model.) 2 Sheets—Sheet 2.
J. YOUNG.
SWITCH DEVICE FOR STREET CARS.
No. 450,549. Patented Apr. 14, 1891.
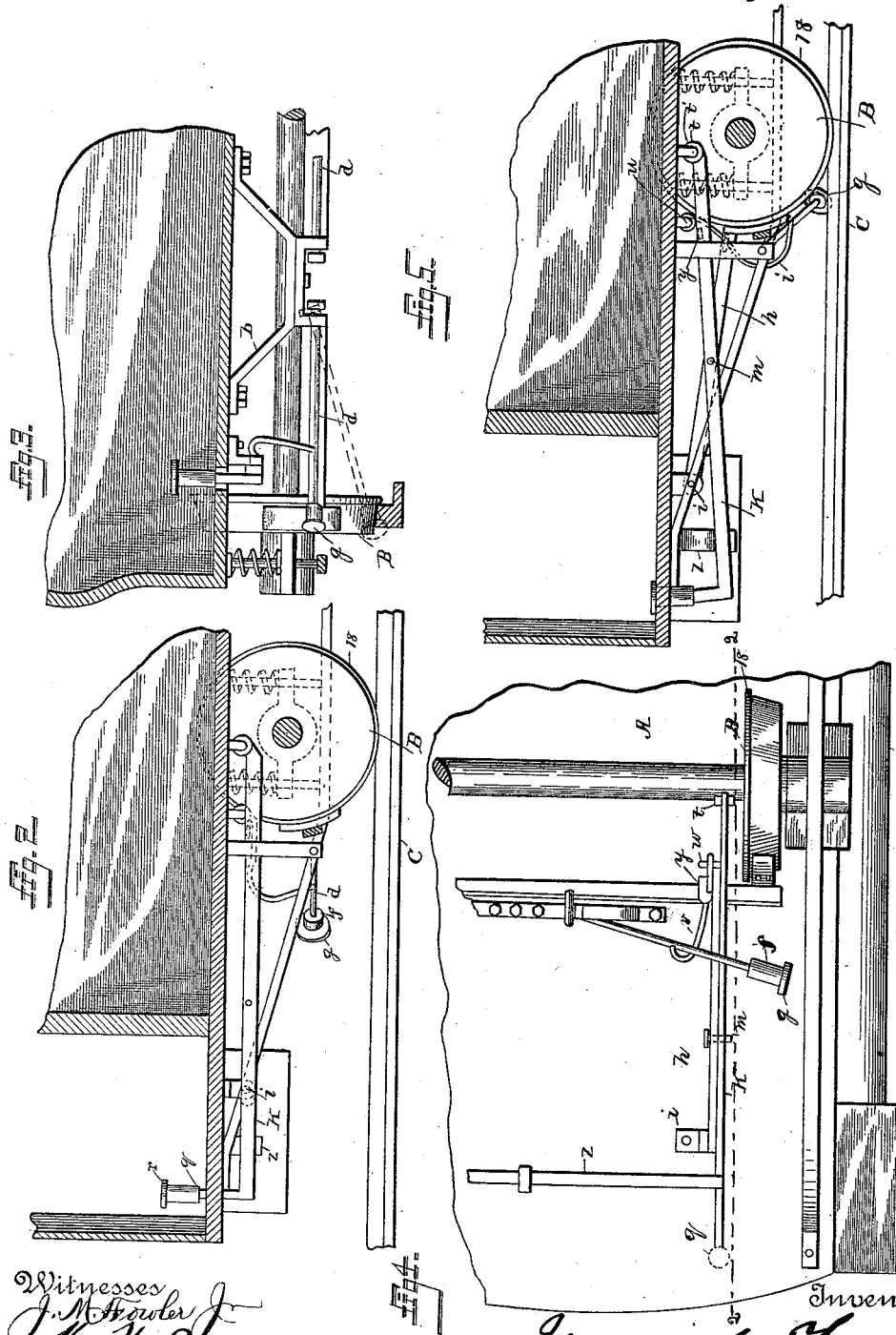

UNITED STATES PATENT OFFICE.

JEREMIAH YOUNG, OF BOSTON, MASSACHUSETTS.

SWITCH DEVICE FOR STREET-CARS.

SPECIFICATION forming part of Letters Patent No. 450,549, dated April 14, 1891.

Application filed October 24, 1889. Renewed February 24, 1891. Serial No. 382,344. (No model.)

*To all whom it may concern:*

Be it known that I, JEREMIAH YOUNG, of Boston, in the county of Suffolk, State of Massachusetts, have invented certain new and useful Improvements in Switch Devices for Street-Cars, of which the following is a description sufficiently full, clear, and exact to enable any person skilled in the art or science to which said invention appertains to make and use the same, reference being had to the accompanying drawings, forming part of this specification, in which—

Figure 1 is a perspective view of a car provided with my improvement; Fig. 2, a vertical longitudinal section of a portion of the car, showing the forward truck and platform, taken on line 2 2 of Fig. 4; Fig. 3, a vertical transverse section; Fig. 4, a bottom plan view; and Fig. 5, a longitudinal section similar to that of Fig. 2, showing the switch-bar and roll depressed.

Like letters and figures of reference indicate corresponding parts in the different figures of the drawings.

My invention relates especially to means for directing a street-car onto a side or branch track from the platform of the car; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the car, B the wheels, and C the track, these parts being all of the ordinary form and construction. A bracket $b$ is secured centrally to the bottom of the car directly in front of the wheel-truck. Two laterally-projecting rods $d$ are swiveled at their ends in the bracket $b$ in such position that their outer or free ends are in position to be directed into engagement with the track C. These rods are provided on their outer ends with a roll $f$, having an annular flange or disk $g$, which takes on the outer edge of the track when said rods are lowered. A longitudinal lever $h$ is pivoted at one end to a bracket $i$ on the bottom of the car, as best shown in Fig. 4. A companion lever $k$ is pivoted at $m$ to the lever $h$, and is extended to project under the platform $p$. A vertical rod $q$ is secured to the forward end of the lever $k$ and projects upward through the platform, its upper end being provided with a foot-piece $r$. The lever $k$ is connected at its inner end by a pivot $t$ to a lug or eye $t'$, attached to the bottom of the car.

A curved hook-shaped rod $v$ is pivoted at $w$ to the car-bottom, its free end loosely encircling a switch-rod $d$. A loop $y$ on the lever $h$, through which the rod $v$ passes, slides thereon and forces said rod downward when the lever is depressed. A flat spring $z$, secured on the car-bottom, engages the forward end of the lever $k$ and acts to keep said lever elevated. The track C where the branch track 15 enters it is provided with a fixed V-shaped switch-block 16 instead of the ordinary movable tongue. A set of levers $h$ $k$ and connecting mechanism above described are disposed at each side of the car for actuating the respective switch-rods $d$.

In the use of my improvement when it is desired to direct or switch the car A onto a branch track 15, leading from the left of the main track C, for example, the driver depresses the left-hand rod $q$ with his foot, forcing the forward end of the lever $k$ downward. Said lever being pivoted to the car at $t$ and to the companion lever $h$ at $m$, the inner end of the lever $h$ is thereby forced downward, said levers assuming the positions shown by dotted lines $h$ $k$ in Fig. 2. The loop or eye $y$ on the lever $h$ is thus forced into engagement with the pivoted curved rod $v$, which is driven downward, carrying with it the swiveled switch-rod $d$ at the left of the car until its rod $f$ rests upon the rail C directly in front of the car-wheel B. The flange $g$ on said roll projects downward over and engages the outer edge of said rail, as described, as near as possible to the point of contact between the wheel and rail. This holds the ordinary flange 18 of the wheel closely against the inner face of the rail, and as it reaches the branch track 15 causes it to be directed therein instead of running straight on the main track. The ordinary block 16 or divided rail being employed to join the branch and main tracks, the roll $f$, following the line of the outside of said track, forces the wheel B to take the same direction. As soon as the foot-piece *r* is freed by the driver the spring *z* forces it upward again, causing the scissors-levers *h k* to close or resume their normal position and elevate the switch-rod, as shown in Fig. 2. The rod *v* is curved to avoid the brake-beam and portions of the truck.

Instead of the flat spring *z*, a coiled spring disposed around the rod *q* may be employed to close the levers.

It will be seen that the use of my improvement obviates the necessity of using a tongue or table switch and enables the driver to direct the car onto a branch track without descending from the platform.

Having thus explained my invention, what I claim is—

1. In a device of the character described, a rod swiveled to the car and provided with a roll having an annular flange adapted to take on the outer edge of the track-rail in front of the car-wheel, and mechanism, substantially as described, for actuating said rod.

2. In a switch mechanism for street-cars, an adjustable flanged roll or wheel on the car, adapted to engage the outer edge of the rail and hold the car-wheel flange in contact with the inner edge of said rail, substantially as and for the purpose set forth.

3. In a switch mechanism for street-cars, a rod swiveled to the car and provided with a flanged wheel adapted to engage the rail, in combination with scissors-levers pivoted on the car, and a supporting-rod connecting one arm thereof with said swiveled rod, substantially as set forth.

4. In a switch mechanism for street-cars, the combination of a rod swiveled to the car, a roll on the free end thereof provided with a flange for engaging the outer edge of the rail, a pivoted supporting-rod therefor, a companion lever pivoted on the car and having an arm connected with said supporting-rod, a rod on the opposite lever-arm projecting through the car-platform, and a spring for returning said levers, substantially as and for the purpose set forth.

5. The combination of the car A and pivoted levers *h k* with the swiveled rod *d*, provided with the roll *f*, having the flange *g*, and the supporting-rod *v*, substantially as and for the purpose set forth.

6. The combination of the car A and swiveled rod *d*, provided with the flanged roll *f*, with the pivoted supporting-rod *v*, levers *h k*, and spring *z*, substantially as described.

7. The combination of the car A and swiveled rod *d*, provided with the flanged roll *f*, with the pivoted supporting-rod *v*, levers *h k*, the rod *q* on the lever *k*, and the spring *z* in contact therewith, substantially as described.

8. In a switch mechanism for street-cars, the combination of a car, scissors-levers pivoted thereto, a rod passing through the car-platform and connected with an arm of said levers, a spring for elevating the same, a swiveled rod on the car bearing a flanged wheel adapted to engage the outer edge of the rail, and a pivoted supporting-rod fitted to slide through a loop on the opposite lever-arm, whereby the swiveled rod may be adjusted as the levers are actuated, substantially as and for the purpose set forth.

JEREMIAH YOUNG.

Witnesses:
O. M. SHAW,
K. DURFEE.